US011999174B2

(12) United States Patent
Connors et al.

(10) Patent No.: US 11,999,174 B2
(45) Date of Patent: Jun. 4, 2024

(54) ENHANCED SPEED THERMAL PRINTER

(71) Applicant: Toshiba America Business Solutions, Inc., Lake Forest, CA (US)

(72) Inventors: William M. Connors, Lexington, KY (US); Donn D. Bryant, Lexington, KY (US); Michael W. Lawrence, Lexington, KY (US)

(73) Assignee: TOSHIBA AMERICA BUSINESS SOLUTIONS, INC, Lake Forest, CA (US)

( * ) Notice: Subject to any disclaimer, the term of this patent is extended or adjusted under 35 U.S.C. 154(b) by 97 days.

(21) Appl. No.: 17/901,946

(22) Filed: Sep. 2, 2022

(65) Prior Publication Data

US 2023/0066010 A1 Mar. 2, 2023

Related U.S. Application Data

(60) Provisional application No. 63/239,994, filed on Sep. 2, 2021.

(51) Int. Cl.

| | |
|---|---|
| ***B41J 2/325*** | (2006.01) |
| ***B41J 2/315*** | (2006.01) |
| ***B41J 11/02*** | (2006.01) |
| ***B41J 11/04*** | (2006.01) |
| ***B41J 11/14*** | (2006.01) |
| ***B41J 11/20*** | (2006.01) |
| *B41J 29/38* | (2006.01) |

(52) U.S. Cl.
CPC ............... *B41J 2/325* (2013.01); *B41J 2/315* (2013.01); *B41J 11/02* (2013.01); *B41J 11/04* (2013.01); *B41J 11/14* (2013.01); *B41J 11/20* (2013.01); *B41J 29/38* (2013.01)

(58) Field of Classification Search
CPC ... B41J 2/325; B41J 2/315; B41J 11/02; B41J 11/04; B41J 11/14; B41J 11/20; B41J 29/38
See application file for complete search history.

(56) References Cited

U.S. PATENT DOCUMENTS

| | | | | |
|---|---|---|---|---|
| 7,355,613 B2 * | 4/2008 | Wiens | B41J 25/312 | 347/171 |
| 2015/0009257 A1 * | 1/2015 | Endo | B41J 11/46 | 347/16 |
| 2022/0088942 A1 * | 3/2022 | Harashina | B41J 2/32 | |

* cited by examiner

*Primary Examiner* — Henok D Legesse
(74) *Attorney, Agent, or Firm* — UB Greensfelder LLP; John X. Garred

(57) ABSTRACT

A system and method for enhanced speed thermal printing has a drive roller for contacting thermochromic medal to a thermal printhead. The drive roller includes a cam which causes the drive roller to decelerate as it approaches the printhead such that contact with the thermal printhead and the thermochromic media is at a highest force point. The drive roller accelerates as it is pulled back from the printhead prior to a next printing cycle.

20 Claims, 3 Drawing Sheets

ENHANCED SPEED THERMAL PRINTER

This application claims priority to U.S. provisional application Ser. No. 63/239,994 filed Sep. 2, 2021.

TECHNICAL FIELD OF THE INVENTION

This application relates generally to printing. The application relates more particularly to enhanced speed for thermal printers.

BACKGROUND OF THE INVENTION

Thermal printing, or direct thermal printing, is a process for printing digitally encoded images. Thermal printers typically operate to produce printed images using paper with a thermochromic coating, commonly known as thermal paper. The paper contacts a print head comprised of tiny electrically heated elements. The coating turns black in the areas where it is heated, producing an image. Most thermal printers are monochromatic, rendering images in black and white.

BRIEF DESCRIPTION OF THE DRAWINGS

Various embodiments will become better understood with regard to the following description, appended claims and accompanying drawings wherein:

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

A thermal printer requires intimate contact with the paper or print media to which an image is being transferred. Not only is intimate contact needed, but also contact under a relatively high load, such as in a range of 13-19 pounds (approximately 58 newtons-85 newtons). In a typical example printer, force may be around 16 pounds (approximately 71 newtons) of force. A typical system has a thermal print-head mounted on a spring loaded platen which applies a force against a driven roller which pulls the media across the face of the print head. A solenoid is used to pull the print head assembly back when it is not time to print.

In example embodiments herein, printer operation is improved by employing a cam mechanism to move the impact mechanism quickly at first with little force and progress to move more slowly with greater force as contact is being made.

Figure 1:
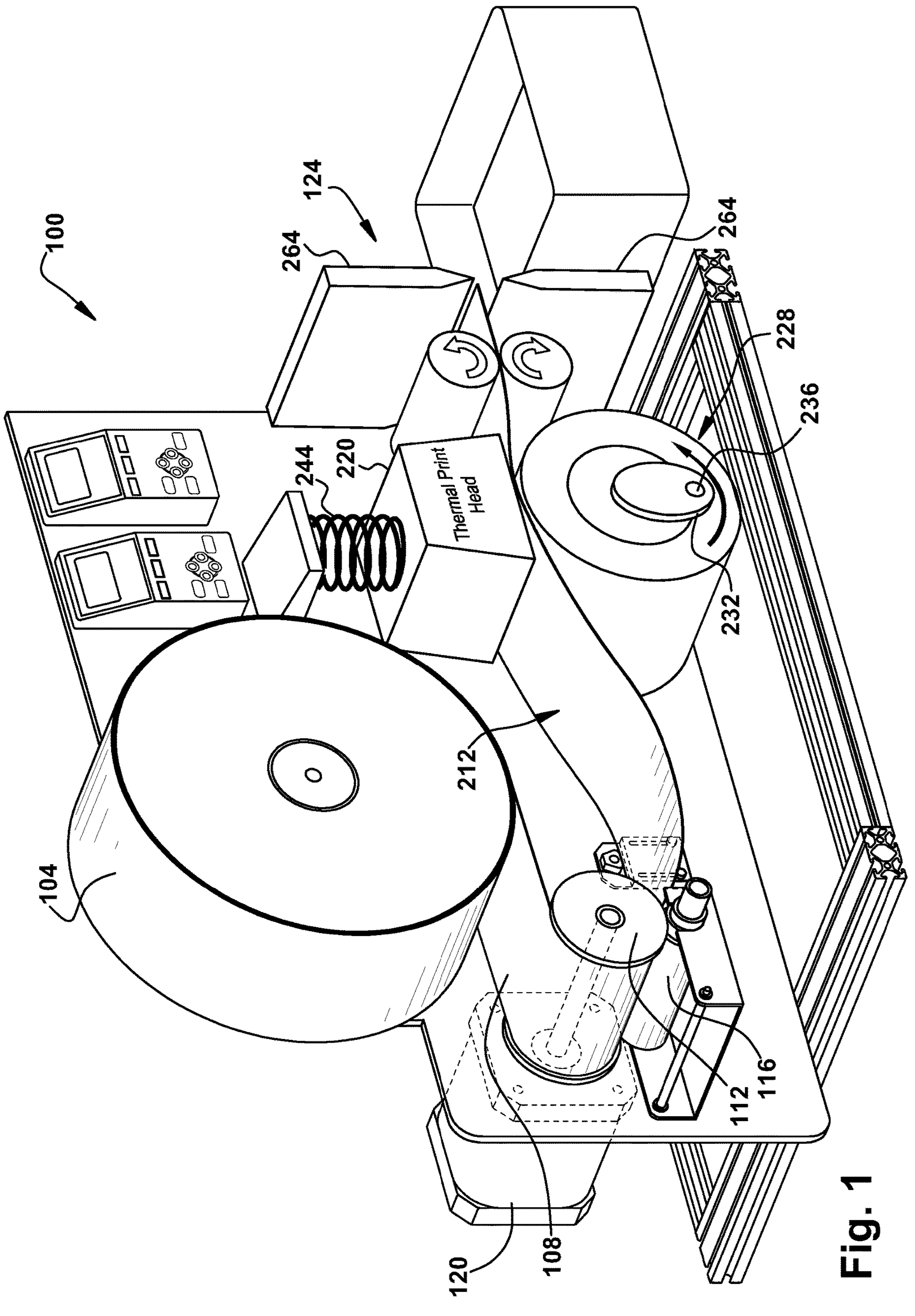
FIG. 1 an example embodiment of a printer, such as a thermal printer.

FIG. 1 illustrates an example embodiment of a printer 100 configured to render images on media, such as spool 104 of thermochromic media, suitably comprising thermal paper 108. First and second cooperative drive rollers 112 and 116 are driven by motor 120 to cooperatively remove media from spool 104 and feed it to thermal printer assembly 124. While spooled media is illustrated, it is understood that individual sheets may be used instead.

Figure 2:
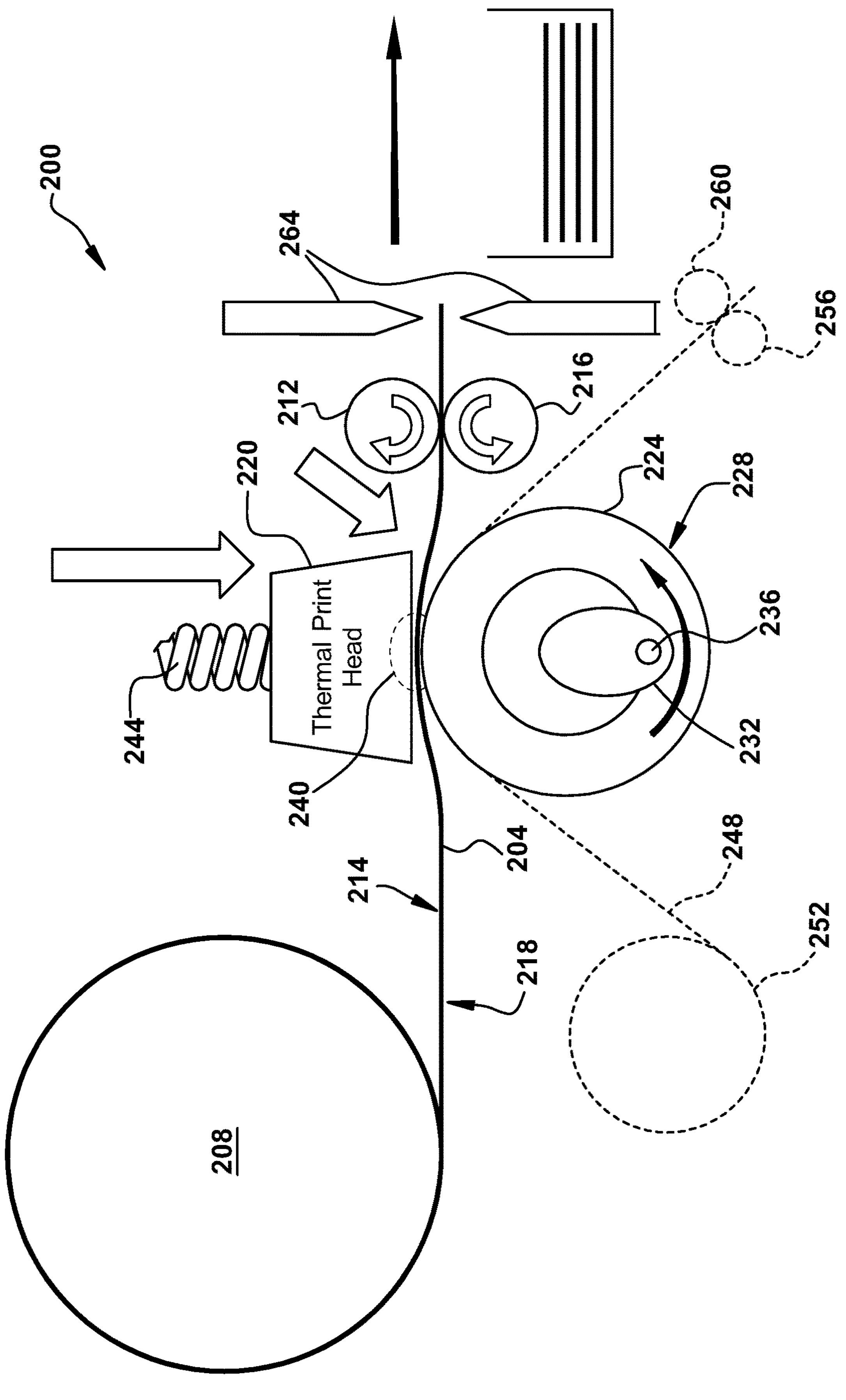
FIG. 2 is an example embodiment of an enhanced speed thermal printing system.

FIG. 2 is a diagram of an example embodiment of an enhanced speed thermal printing system 200. Thermochromic media 204 is removed from spool 208 by first and second, opposed feed rollers 212 and 216. Thermochromic media 204 has a first side 216 and a second side 218 and passes between thermal printhead 220 and backing roller 224. Backing roller 224 includes backing roller contact surface 228 which functions as a rotatable platen for thermal printhead 220. Backing roller 224 includes a cam portion 232 configured to rotate around drive shaft 236. As backing roller 224 rotates relative to cam portion 232, it moves toward and away from thermal printhead 220 with a force and acceleration dictated by cam portion 232. So configured, backing roller 224 commences movement toward thermal printhead 220 at a high velocity, decelerating as it approaches. Backing roller 224, in contact with second side 218, urges first side 214 of thermochromic media 204 to contact the thermal printhead 220 in heated print area 240. Contact between the first side 214 and the thermal printhead 220 thus occurs at a point of highest force being applied from backing roller 224. Continued rotation of backing roller 224 commences an accelerating rotation as it moves away from the thermal printhead 220. Thus, printing time can be shortened due to accelerating and decelerating a speed of backing roller 224 relative to contacting the thermal printhead 220, while contacting the thermal printhead 220 at a point of maximum force.

Actual force on the thermal printhead 220 is constrained by use of biasing spring 244 affixed to the thermal printhead 220. When contact is made with the thermal printhead 220, biasing spring 244 is compressed and force is limited to a value associated with its spring constant k with the equation:

$$F=-k(x)$$

wherein the constant force F is specified by the spring constant and x is a spring displacement distance.

The above-described system is referred to as direct thermal printing insofar as the media itself is thermally sensitive. In indirect thermal printing, thermal paper or ribbon is heated by a printhead and an image is transferred onto media, such as paper. Illustrated in phantom in FIG. 2 is an alternative example embodiment for indirect printing. In this situation, paper media 248 is fed from supply roll 252 into print area 240 along with thermally transmissive paper where an image transfer is made. Paper is advanced in accordance with drive rollers 256 and 260. When rolled media is used, it is suitably separated into individual printouts via a media cutter 264 which severs the thermochromic media 204 for direct thermal printing or the paper media 248 for indirect thermal printing.

Figure 3:
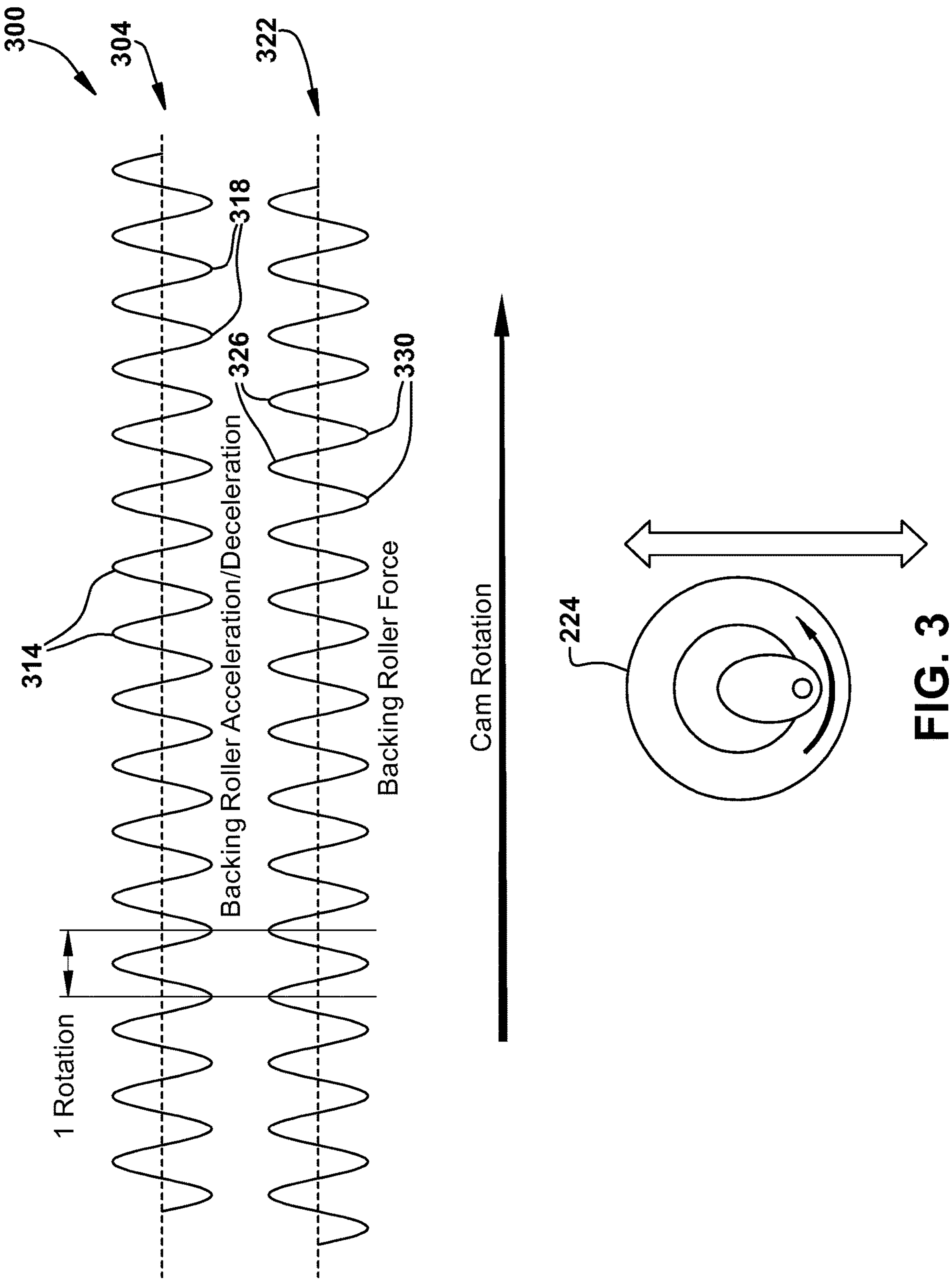
FIG. 3 illustrates an example embodiment of a drive roller force and acceleration diagram.

FIG. 3 illustrates a force and acceleration diagram 300 relative to backing roller 224, discussed above. Acceleration/deceleration curve 304, directed to movement of backing roller 224 shows periodically acceleration, with peak acceleration reached at apogee points 314. Deceleration occurs until perigee points 318. Backing roller force curve 322 shows peak force at apogee points 326 and lowest force at perigee points 330. In the illustration, force and acceleration are 180° out of phase, such that peek acceleration is when force is lowest, and peek deceleration is when force is highest.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:

first and second drive rollers configured to cooperatively move thermochromic media relative to a thermal printhead;

the thermal printhead configured to be positioned adjacent to but not in contact with a first side of the thermochromic media;

a biasing spring secured to the thermal printhead, the biasing spring configured to bias the thermal print head for perpendicular movement relative to the thermochromic media;

a backing roller disposed on a second side of the thermochromic media opposite the thermal printhead, the backing roller having an axis perpendicular to a feed direction of the thermochromic media;

the backing roller configured to be positioned adjacent to the second side of the thermochromic media;

the backing roller including an elliptical cam portion;

a drive shaft coupled to the elliptical cam portion, the drive shaft disposed radially relative to the axis of the backing roller; and a motor configured to rotate the drive shaft wherein, when rotated the backing roller periodically causes the first side of the thermochromic media to contact the thermal printhead while compressing the biasing spring, and periodically causes the first side of the thermochromic media to break contact with the thermal printhead.

2. The system of claim 1 wherein an the elliptical cam portion has a major axis radially extending from the axis of the backing roller, and wherein a first side of the major axis is disposed radially outward from an opposed, second side of the major axis, and wherein the drive shaft is coupled to the first side of the major axis.

3. The system of claim 2 wherein the biasing spring has a spring constant corresponding to a thermal printing printhead contact pressure.

4. The system of claim 3 wherein a thermal printing contact pressure is in the range of 13 pounds to 19 pounds.

5. The system of claim 4 wherein the elliptical cam portion is disposed on a side of the backing roller.

6. The system of claim 5 further comprising third and fourth drive rollers configured to cooperatively move paper media relative to the thermal print head concurrently with the thermochromic media such that an image is formed on the paper media by contact between the thermochromic media and the paper media.

7. The system of claim 5 wherein the backing roller accelerates then decelerates to contact the thermochromic media.

8. A method comprising:

moving thermochromic media relative to a thermal print head via first and second drive rollers;

positioning the thermal printhead to be adjacent to but not in contact with a first side of the thermochromic media;

positioning a backing roller on a second side of the thermochromic media opposite the thermal printhead, the backing roller having an axis perpendicular to a feed direction of the thermochromic media; and rotating a cam portion of the backing roller such that the backing roller, when rotated engages the second side of the thermochromic media so as to cause the first side of the thermochromic media to contact the thermal printhead while compressing a biasing spring associated with the thermal printhead, periodically causes the first side of the thermochromic media to break contact with the thermal printhead.

9. The method of claim 8 wherein an elliptical cam portion has a major axis radially extending from the axis of the backing roller, and wherein a first side of the major axis is disposed radially outward from an opposed, second side of the major axis, and wherein a drive shaft is coupled to the first side of the major axis.

10. The method of claim 9 wherein the biasing spring has a spring constant corresponding to a thermal printing printhead contact pressure.

11. The method of claim 10 wherein a thermal printing contact pressure is in the range of 13 pounds to 19 pounds.

12. The method of claim 11 wherein the cam portion is disposed on a side of the backing roller.

13. The method of claim 12 further comprising moving a paper media relative to the thermal print head concurrently with the thermochromic media such that an image is formed on the paper media by contact between the thermochromic media and the paper media.

14. The method of claim 12 wherein the backing roller accelerates then decelerates to contact the thermochromic media.

15. A method comprising:

positioning a print media such that a first side thereof is adjacent to but not in contact with a printhead;

accelerating a position of a backing roller disposed on a second side of the print media opposite the printhead toward the second side of the print media and the printhead;

decelerating the position of the backing roller toward the second side of the print media and the printhead and, after deceleration, the backing roller urging contact between the printhead and the first side of the print media and compression of a biasing spring associated with the printhead;

accelerating the position of the backing roller away from the print media and the printhead; and decelerating the position of the backing roller away from the print media and the printhead.

16. The method of claim 15 further comprising generating an image on the print media in accordance with contact between the printhead and the print media.

17. The method of claim 16 a force potential between the printhead and the backing roller increases during deceleration and decreases during acceleration.

18. The method of claim 17 further comprising selectively heating a surface of the printhead to generate the image.

19. The method of claim 18 wherein the print media is thermochromic.

20. The method of claim 19 further comprising periodically accelerating and decelerating the backing roller toward the print media and the printhead, and periodically accelerating and decelerating the backing roller away from the print media and the printhead.

* * * * *